A. SHAW.
STANCHION.
APPLICATION FILED JAN. 20, 1910.

989,434.

Patented Apr. 11, 1911.

Witnesses
J. Milton Jester
L. C. Brady

Inventor
Amos Shaw
By J. S. Barker
His Attorney

UNITED STATES PATENT OFFICE.

AMOS SHAW, OF LIVINGSTON, MONTANA.

STANCHION.

989,434.  Specification of Letters Patent.  Patented Apr. 11, 1911.

Application filed January 20, 1910. Serial No. 539,147.

*To all whom it may concern:*

Be it known that I, AMOS SHAW, a citizen of the United States, residing at Livingston, in the county of Park and State of Montana, have invented certain new and useful Improvements in Stanchions, of which the following is a specification.

This invention relates to stanchions for securing cattle and has for its object to improve such devices and to produce a stanchion that is strong and durable, simple in construction, that may be cheaply manufactured, and can be operated from a distance so that an animal can be secured or released without necessitating close approach to its head.

Figure 1:
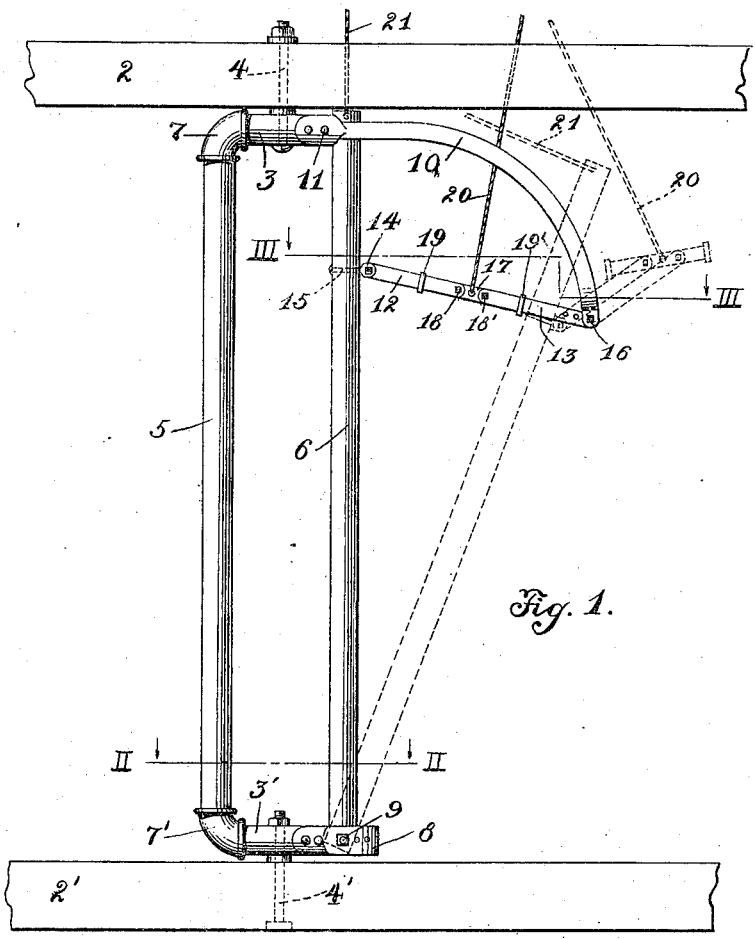
Figure 2:
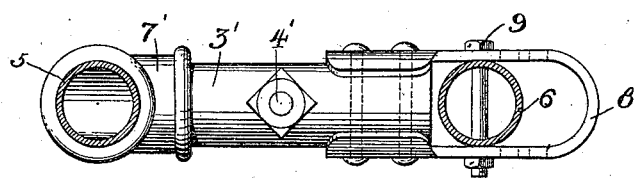
Figure 3:
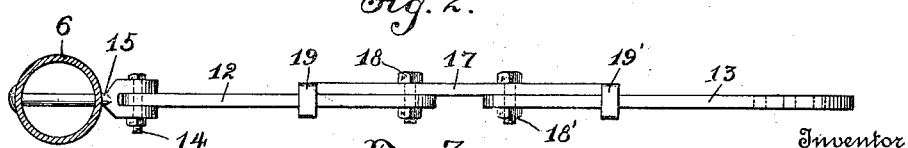

I have, in the accompanying drawings, illustrated the preferred embodiment of my invention, and referring to these, Figure 1 is a front elevation of the stanchion, it being represented in closed position by full lines, and in open position by dotted lines. Fig. 2 is a cross sectional view taken on the line II—II of Fig. 1. Fig. 3 is a sectional view taken on the line III—III of Fig. 1.

In the drawings, 2, 2' represent respectively, the top and bottom horizontal pieces of the stationary framework in which the stanchion is mounted. The latter is preferably of the swivel variety and comprises a top cross piece 3, a bottom cross piece 3' and a fixed stanchion bar 5, and a movable stanchion bar 6 uniting these cross pieces. The cross pieces of the stanchion are united to the stationary frame by swivel bolts 4, 4', in which the stanchion turns. The parts of the stanchion designated 3, 3', 5 and 6, are preferably formed of metal tubing, though they may be made of other material if preferred. As shown, the fixed stanchion bar is connected with the cross pieces by coupling L's 7, 7'. The movable stanchion bar is pivotally connected with the lower cross piece 3', preferably by means of a piece of strap metal 8, riveted or otherwise secured to the lower cross piece and extending beyond the end thereof to form an open loop, as represented in Fig. 2. In this loop the lower end of the stanchion bar 6 is mounted and it is secured to the strap piece 8 by pivot bolt 9. The upper free end of the movable bar lies between the two parallel arms of a curved guide 10, which is secured at 11 to the cross bar 3.

Between the outer end of the guide 10 and the movable stanchion bar 6 is a lock for holding the bar securely in closed position, as represented in full lines in Fig. 1. This lock is preferably composed of a number of links pivoted to each other, and arranged when in locking position to be substantially in line one with the other, and is adapted to be easily broken, that is to say, to have the parts of the lock turn on their pivots and fold so as to permit the stanchion bar 6 to swing into the position indicated in dotted lines in Fig. 1, thus opening the stanchion. The stanchion lock comprises a link 12 pivotally connected with the movable stanchion bar, a link 13 pivotally connected with the outer end of the guide 10, and a connecting piece or intermediate link 17 pivotally connected to the inner ends respectively, of the links 12 and 13. The inner link 12 is connected with the stanchion bar by an eye-bolt 15 to which it is united by a pivot 14, and in turn is connected with the intermediate link 17 by pivot bolt 18 passing through the intermediate link at a point between its ends. The outer link 13 is connected with the guide 10 by a bolt or pivot 16 on which it is free to turn, and is pivotally connected at 18' with the intermediate link.

It will be seen by reference to Figs. 1 and 3 that the bolts 18, 18' pass through the intermediate link at points respectively well back from its ends, and that such intermediate link is provided at or near its ends with loops or clasps 19, 19' adapted to straddle respectively the links 12 and 13 when the lock is extended as indicated in full lines in Fig. 1. When in this position, as already stated, the lock serves to hold the stanchion closed, and as the loops or clasps 19, 19' operate to maintain the links of the lock in line with each other, the stanchion is held locked securely, whatever may be the movements of the animal. A rope or other flexible cord 20 is secured to the intermediate link between the pivots 18, 18', and passes thence upward over a pulley or other supporting and directing means, not shown in the drawings. Draft being applied to the cord 20 it breaks the lock, moving its parts upward and allowing the movable bar of the stanchion to swing upon its pivot into the position indicated in dotted lines. Another cord 21 is secured to the bar 6 and is directed so that draft being applied thereto, the stanchion will be closed.

The inner or stanchion bar connection, 14, of the lock is preferably higher than the outer support, 16, therefor, when the stanchion is in locked position, with the result that the lock occupies an upwardly inclined position from its outer to its inner end when the stanchion is closed; this arrangement also insuring that the links shall fold outward as well as upward when the stanchion is open, as indicated in Fig. 1, thus permitting full movement of the upper end of the stanchion bar. The links 12 and 13 lie substantially parallel with each other when the stanchion is open, the lock hence occupying but little longitudinal space.

It will be seen that the arrangement of the several parts of the lock is such that they are held by gravity in the locking position, where they are maintained by the loops or clasps 19, 19′.

The lock which I have described, while particularly well adapted for use in connection with a stanchion for holding animals, is also adapted for use in connection with other securing or confining means, as for instance, gates or doors.

What I claim is:

1. The combination of a fixed stanchion bar, a pivoted stanchion bar, a lock for the pivoted stanchion bar comprising a link pivotally connected therewith, another link pivotally supported at a distance from the movable stanchion bar, and an intermediate link pivotally connected with and uniting the said two links, means for maintaining the parts of the lock substantially in line with each other to hold the pivoted stanchion bar in closing position, and means for moving the said links to open the stanchion, connected with the intermediate link of the lock.

2. The combination of a fixed stanchion bar, a stanchion bar pivoted at its lower end, a guide for the upper end of the pivoted bar consisting of two parallel arms between which the free end of the pivoted bar is adapted to move, and a lock for holding the pivoted bar in closed position extending between the outer end of the guide and the pivoted bar and consisting of a pair of connected links one of which is pivotally connected with the outer end of the guide and the other pivotally connected with the movable stanchion bar, at a level, when the stanchion is closed, higher than that of the connection of the lock with the guide, the said links of the lock being arranged to fold upward and outward between the bars of the guide when the stanchion is opened, substantially as set forth.

3. The combination of a fixed stanchion bar, a pivoted stanchion bar, a guide for the latter, a lock comprising a link provided to the pivoted stanchion bar, another link pivoted to the outer end of the guide, and an intermediate link pivotally connected with and uniting the said two links, the intermediate link extending at each end beyond its pivots where it is provided with clasps for engaging the links to which it is connected, the said clasps being arranged to maintain the parts of the lock in locking position, substantially as set forth.

4. In a stanchion, the combination of a fixed stanchion bar, a stanchion bar pivoted at its lower end, and a lock for holding the pivoted bar in closed position, the lock consisting of a pair of connected links, one of which is pivotally connected with the stanchion bar and the other with an abutment or support to one side of the stanchion bar, the connection of the link of the lock with the stanchion bar being at a higher level than the outer pivotal connection of the lock, whereby when the stanchion is closed the locking links are substantially in line with each other and extend in a downward direction from the said bar, substantially as set forth.

AMOS SHAW.

Witnesses:
VARD SMITH,
L. C. SHAW.

Copies of this patent may be obtained for five cents each, by addressing the "Commissioner of Patents, Washington, D. C."